US008687324B2

(12) United States Patent
Biskeborn et al.

(10) Patent No.: US 8,687,324 B2
(45) Date of Patent: Apr. 1, 2014

(54) TAPE DRIVE HEAD WITH JOINTLY OPTIMIZED SHIELD-TO-SHIELD GAP AND SENSOR WIDTH

(75) Inventors: Robert G. Biskeborn, San Jose, CA (US); Giovanni Cherubini, Rueschlikon (CH); Simeon Furrer, Rueschlikon (CH); Pierre-Olivier Jubert, San Jose, CA (US); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/277,378

(22) Filed: Oct. 20, 2011

(65) Prior Publication Data

US 2013/0100554 A1 Apr. 25, 2013

(51) Int. Cl.
*G11B 5/127* (2006.01)
(52) U.S. Cl.
USPC ........................................... 360/319; 360/322
(58) Field of Classification Search
None
See application file for complete search history.

(56) References Cited

U.S. PATENT DOCUMENTS

| 7,760,465 | B2 | 7/2010 | Koeppe |  |
|---|---|---|---|---|
| 7,990,659 | B2 * | 8/2011 | Biskeborn et al. | 360/319 |
| 2010/0053817 | A1 * | 3/2010 | Biskeborn et al. | 360/313 |

OTHER PUBLICATIONS

David Berman et al., "6.7 Gb/in2 Recording Areal Density on Barium Ferrite Tape," IEEE Transactions on Magnetics, vol. 43, No. 8, pp. 3502-3508, Aug. 2007.
Giovanni Cherubini et al., "29.5-Gb/in2 Recording Areal Density on Barium Ferrite Tape," IEEE Transactions on Magnetics, vol. 47, No. 1, pp. 137-147, Jan. 2011.
Standard ECMA-319, "Data Interchange on 12,7 mm 384-Track Magnetic Tape Cartridges-Ultrium-1 Format," Standardizing Information and Communication Systems, Jun. 2001.
M.L. Plumer et al., "The Physics of Ultra-High-Density Magnetic Recording," Springer, Heidelbert; pp. 277-288, 2001.

* cited by examiner

*Primary Examiner* — Paul Huber
(74) *Attorney, Agent, or Firm* — Cantor Colburn LLP; Daniel Morris (57) ABSTRACT

A tape drive head includes a set of one or more servo readers designed for reading a servo pattern of a linear recording tape for positioning of the tape drive head, each of the servo readers of the set having: a sensor for sensing a magnetic field component of a servo pattern upon reading it; a first shield and a second shield, one on each side of the sensor, the shields configured to shield spurious components of magnetic fields occurring upon reading the linear recording tape, wherein: a gap between the first shield and the second shield is between 0.4 μm and 1 μm, and a minimal width of the sensor, the first shield and the second shield, in a direction perpendicular to the gap, is between 0.5 μm and 4 μm.

18 Claims, 4 Drawing Sheets

TAPE DRIVE HEAD WITH JOINTLY OPTIMIZED SHIELD-TO-SHIELD GAP AND SENSOR WIDTH

BACKGROUND

The invention relates to the field of tape drive and tape drive heads for linear recording tapes (e.g. linear magnetic tapes). In particular, it relates to jointly optimized dimensional parameters of servo readers of the tape drive head.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending on the embodiment. Optical media, holographic media and other media formats may also make use of such data tracks. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo head reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

In a magnetic tape, the servo patterns are stored on dedicated tracks (called servo bands). A plurality of patterns may be defined within a servo band and a plurality of servo bands might be relied upon, the data tracks being arranged between the servo bands. A particular servo technique is based on the timing-based servo (TBS) pattern, which makes use of parallel and non-parallel marks, to which time or distance variables can be associated. The time/distance offset related to the detection of a set of servo marks is translated into a position signal. A position error signal (PES) can then be generated by subtracting a reference signal from the position signal to determine the position of a transducer relative to a data track.

Figure 1:
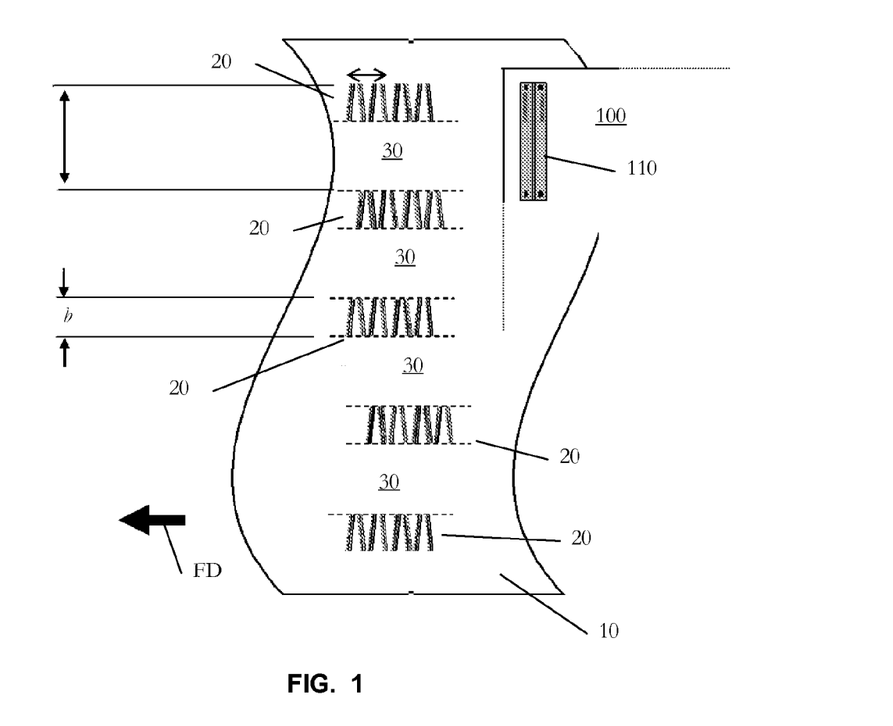
FIG. 1 (prior art) schematically illustrates a typical TBS linear tape.
Figure 2:
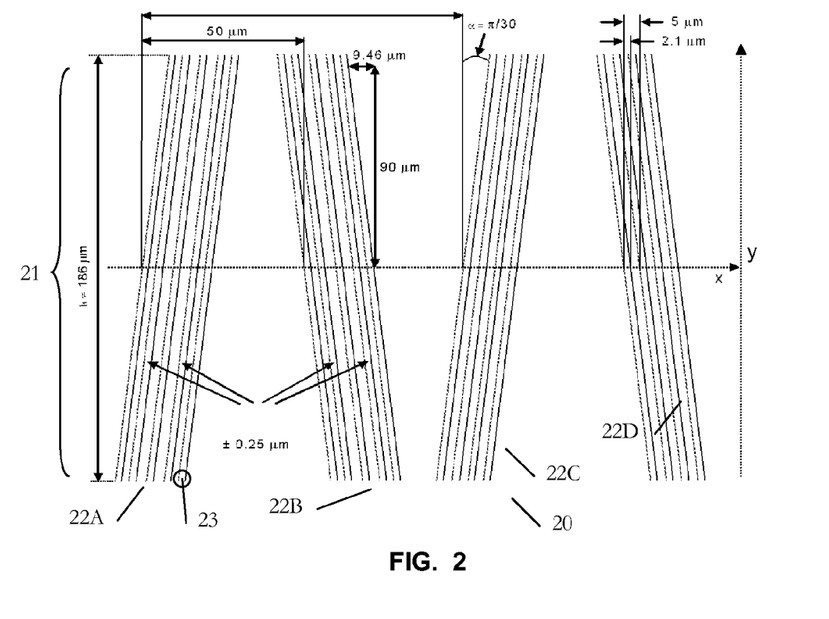
FIG. 2 (prior art) schematically depicts a pattern of a typical servo band.

In somewhat more detail, the TBS technology was developed specifically for linear tape drives in the late '90s. In a TBS system, a linear recording tape has one or more servo patterns which consist of transitions with two different azimuthal slopes. A typical linear recording tape 10 is illustrated in FIG. 1. It notably shows a servo band 20 with a typical servo pattern 21, the latter depicted in more details in FIG. 2. While reading or writing the tape, the tape moves relative to the head in the longitudinal direction x of the tape. In addition, the tape drive head 110 is moved in the direction y, i.e., transverse to the direction x. In FIG. 1, the arrow FD denotes a forward direction of the tape motion. As explained above, the position of the head is derived from the relative timing of pulses generated by a servo reader reading the pattern, which obviously depends on the exact y-position of a servo-reader of the head. FIG. 2 illustrates the geometry of a servo pattern as specified in the so-called linear tape-open (LTO) format.

For instance, assuming a constant velocity of a tape comprising the following servo pattern "//// \\\\", the relative timing of pulses generated by successive marks "/////" and "\\\\\" increases as the head moves downwards; it decreases as the head moves upwards. Thus, for a given pattern, a known period corresponding to a given servo location line defined in the pattern and a constant tape velocity, the distance between the servo location and the lateral position corresponding to a target data track can be monitored. TBS patterns are implemented in magnetic tape media but may also be useful in other media.

The complete format for LTO drives of generation 1 (LTO-1) was standardized by the European Computer Manufacturers Association (ECMA) in 2001 as ECMA-319. Additional information on LTO technology, in particular on LTO drives of generations 2 to 5 (LTO-2 to LTO-5), where the servo format was not modified, can be found on the World Wide Web (www), e.g., at ultrium.com. TBS patterns also allow the encoding of additional longitudinal position (LPOS) information without affecting the generation of the transversal position error signal (PES). This is obtained by shifting transitions from their nominal pattern position x as also shown in FIG. 2.

Figure 3:
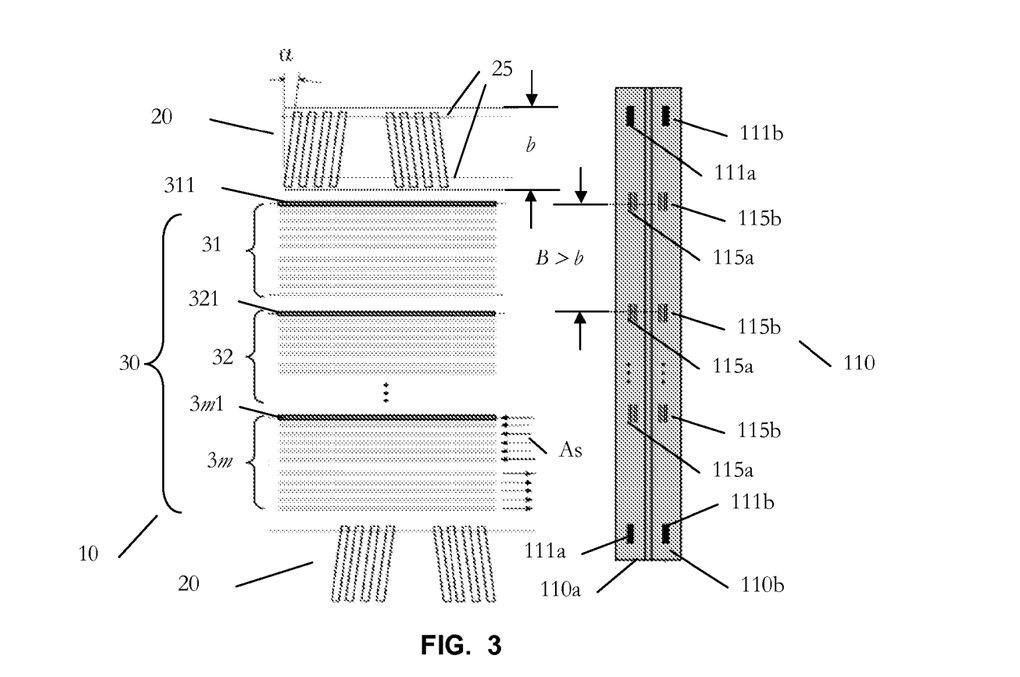
FIG. 3 (prior art) depicts a TBS system, wherein a tape drive head is operated along a linear tape.

In further detail, and in reference to FIGS. 1 and 3, a servo pattern 21 is prerecorded in several servo bands distributed across the tape, e.g., five bands in the LTO servo format (and some proprietary servo formats as well). Storage data is recorded in the regions 30 (data bands) located between pairs of servo bands. A data band 30 is partitioned into m sub-bands 31-3$m$ that correspond to the data read/write transducers hosted in the head, i.e., m is equal to the number of transducers simultaneously reading or writing m data tracks, which form a wrap. Each sub-band is partitioned into n tracks that belong to the n wraps. For example, in FIG. 2 the bold tracks 311, 321, . . . , 3$m$1 correspond to what is usually referred to as wrap 0 for data band 0 in the LTO specification. FIG. 1 schematically illustrates the positioning of the five servo bands and the four data bands 30 as specified in the LTO format. In the read/write heads of LTO and some Enterprise tape drives, at least two servo readers are normally available per head module, from which LPOS information as well as position information can be derived. In addition, the head of the tape drive typically consists of at least two head modules. For example, in FIG. 3 the left head module 110$a$ of head 110 hosts at least two servo readers 111$a$.

Several methods exist for the detection of the servo patterns. Such methods ensure the processing of a servo signal for the generation of not only the lateral position y-estimates but also for the generation of velocity estimates of a tape relative to tape drive head in the longitudinal x direction, which are then employed for the control of track-following and reel-to-reel servomechanisms of the tape drive. It turns out that the quality of the PES estimates, which are obtained from the y-estimates, depends on various parameters of the servo patterns. One such parameter is the azimuth angle $\alpha$ ($\alpha=6°$ for LTO standards 1 to 5). Other parameters are the servo reader width and servo stripe width s, that is, the minimum distance between magnetic transitions (e.g., s=2.1 microns (μm) for LTO 1 to 5). The width of the servo band is usually the same from one standard to another. These parameters impact the resolution of the position error signal used for track following. Ultimately, the resolution of this signal limits track following performance and hence the track density that can be achieved. At high storage areal densities, an optimization of the servo pattern geometry is useful to achieve a minimum value of standard deviation of the PES.

Efforts have been made to optimize the servo patterns. In particular, servo pattern optimization has focused on the choice of: (i) parameters defining the servo pattern geometry, e.g., the azimuth angle α, which increases the position signal resolution, and (ii) the pattern itself, e.g. for minimizing written-in velocity errors. For example, it is known that increasing the azimuth angle from 6 to 12 or even 18 degrees, a substantial improvement in the quality of position signal estimation can be achieved, which translates into lower values of PES standard deviation. Similarly, it is known that the so-called "M" and "N" servo patterns lead to PES estimation, which is insensitive to written-in velocity errors.

Next, in linear tape drives, the m read/write transducers are evenly spaced at, e.g., a pitch of 166.5 µm across the width of a data band of 2664 µm in LTO 4. The data band area is written/read by writing/reading m tracks simultaneously forming a wrap and laying out the wraps in a serpentine fashion. This is reflected in FIG. 3, see the successive arrows "As" indicating tracks that belong to different wraps. A data band 30 is for instance filled by running the tape forth and back n times forming 2n wraps, shifting the position of the read/write transducers to another wrap location at each pass and this operation is repeated, until the entire data band is filled. The position in the servo band 20 that corresponds to a given wrap (e.g., the tracks 311, 321, . . . , 3m1 of wrap 0) is referred to as a servo location. Two such servo locations are depicted by horizontal gray lines 25 in FIG. 3. As explained above, the servo pattern must provide position information for positioning the head at each of these servo locations. Hence, the width of the servo band (186 µm in the example of FIG. 1) is primarily determined by the pitch between adjacent transducers in the read/write head, in the direction transverse to the tape direction. This pitch is in turn determined by the number m of parallel channels implemented. For example, LTO 4 drives comprise 16 parallel data channels, resulting in a pitch between writers of ~2859/16~166.5 µm. This substantially corresponds to the typical servo band width, i.e., 186 µm, subject to a margin that accounts for the width of the servo reader and for tracking errors. Accordingly, the servo band width is chosen such as to provide tracking information for all wrap locations in a data band.

In addition to the resolution of the y-position estimates described above, it can be realized that another parameter is important for determining the performance of the track following control system, which is the update rate of the position estimates. A high update rate is of particular importance for operation at low tape velocities, which is required for matching the drive data rate to the data rate of slower hosts. Thus, ideally, one may want to increase both the resolution of the pattern as well as the update rate of the lateral position and velocity estimates.

As the tape drive systems for linear tape formats such as the LTO format typically have one or two heads, each head having an array of transducers for writing to and reading from the tape. For example, a state-of-the-art multichannel tape magnetic recording head today contains sixteen data channels and two servo reader channels in each of two bidirectional modules. Each servo reader typically comprises a sensor (for sensing a magnetic field component when reading the servo pattern), the sensor located between two shields, one on each side of the sensor. The shields are configured to shield spurious components of magnetic fields occurring upon reading the tape. Typically, the shield-to-shield gap (i.e., spacing) in a servo reader is set and scaled based on the design of the data readers. For instance, a usual practice is to fabricate the servo reader channels using the same shield-to-shield gap dimensions as those in the data reader channels, as this minimizes fabrication costs. Finally, as technology advances, the data reader gaps are optimized to thinner dimensions, providing for detection of higher linear densities of magnetic transitions along the tape. To summarize years of evolution in this field, servo reader shield-to-shield gaps evolved from around 0.35 µm for the first generation of LTO down to 0.18 to 0.3 µm for current tape drives.

Other dimensions of the servo readers like the servo reader width (perpendicular to the gap and hence perpendicular to the longitudinal direction of motion of the tape during normal drive operation) usually attract less attention, if not at all. For instance, the servo reader width has been almost systematically set to 6 to 8 µm.

U.S. Pat. No. 7,760,465 discloses mechanisms for optimizing multiple read channels of different varieties on a magnetic recording head uniquely for performance, reliability, and/or thermal characteristics, while still building (fabricating) the multiple readers simultaneously. Embodiments of this invention provide increased signal amplitude and increased protection against shorting in some channels contained in advanced multichannel narrow gap recording heads, where the gap of these channels do not require the narrowest gap of the population of channels in that head. The magnetic heads have multiple reader channels deposited simultaneously as shielded magnetoresistive transducers (e.g., GMR devices, Anisotropic Magnetoresistive (AMR) devices, Tunneling Magnetoresistive (TMR) devices, etc.). The deposited nonmagnetic gaps to each shield (upper and lower) of each transducer (channel) may be of different thicknesses in order to optimize that channel's characteristics. Varying gap size is regarded as important for performance characteristics, such as for reading a particular linear density. A smaller gap is desirable for reading a tape with a high linear data density because the resolution of the reader is finer. However, a reader with a larger gap provides a stronger signal (higher amplitude) and a higher Signal to Noise (S/N) ratio as compared to a reader with a smaller gap when reading lower linear densities. A higher amplitude is regarded desirable for such functions as reading the servo track on the tape. However, as mentioned above, increasing the gap reduces the signal resolution, which eventually offsets the benefits of an increased S/N ratio, even for low density patterns. For example, the servo pattern used on tapes may be the same from format family to format family, e.g., LTO-1 to LTO-2 may use the same servo pattern, though the linear data density of the data tracks may have increased. Accordingly, the gaps of the servo readers are thicker than the gaps of the data readers (in some embodiments), providing increased signal amplitude and increased reliability (e.g., protection from shorting) in the servo readers, while having the high data resolution provided by the narrow gaps of the data readers.

BRIEF SUMMARY

According to an aspect, a tape drive head includes a set of one or more servo readers designed for reading a servo pattern of a linear recording tape for positioning of the tape drive head, each of the servo readers of the set having: a sensor adapted for sensing a magnetic field component of a servo pattern; a first shield and a second shield, one on each side of the sensor, the shields configured to shield spurious components of magnetic fields occurring upon reading the linear recording tape, wherein: a gap between the first shield and the second shield is between 0.4 µm and 1 µm, and a minimal width of the sensor, the first shield and the second shield is between 0.5 µm and 4 µm, the width defined in a direction perpendicular to the gap, in a sensing plane of the sensor, the first shield and the second shield.

In embodiments, the tape drive head may include one or more of the following features: the minimal width is less than or equal to five times the gap; the minimal width is less than or equal to four times the gap; for at least one servo reader of the set: the gap between the first shield and the second shield of the at least one servo reader of the set is 0.5±0.1 µm; for at least one servo reader of the set: the gap between the first shield and the second shield of the at least one servo reader of the set is 0.5±0.1 µm; and the minimal width of the sensor, the first shield and the second shield of the at least one servo reader of the set, in a direction perpendicular to its gap, is 2±1 µm; for at least one servo reader of the set: the gap between the first shield and the second shield of the at least one servo reader of the set is 0.5±0.1 µm; and the minimal width of the sensor, the first shield and the second shield of the at least one servo reader of the set, in a direction perpendicular to its gap, is 2±0.5 µm; for at least one servo reader of the set: the gap between the first shield and the second shield of the at least one servo reader of the set is 0.5±0.1 µm; and the minimal width of the sensor, the first shield and the second shield of the at least one servo reader of the set, in a direction perpendicular to its gap, is 1±0.5 µm; for at least one servo reader of the set: the gap between the first shield and the second shield of the at least one servo reader of the set is 0.8±0.2 µm; for at least one servo reader of the set: the gap between the first shield and the second shield of the at least one servo reader of the set is 0.8±0.2 □m; and the minimal width of the sensor, the first shield and the second shield of the at least one servo reader of the set, in a direction perpendicular to its gap, is 3±1 µm; the set comprises at least two servo readers, wherein one of the at least two servo readers has a larger gap than another one of the at least two servo readers; the gap between the first shield and the second shield of the another one of the at least two servo readers is 0.5±0.1 µm; and the gap between the first shield and the second shield of the one of the at least two servo readers is 0.8±0.2 µm; for the another one of the servo readers of the set: the gap between the first shield and the second shield of the another one of the servo readers of the set is 0.5±0.1 µm; and the minimal width of the sensor, the first shield and the second shield of the another one of the servo readers of the set, in a direction perpendicular to its gap, is 2±1 µm, and for the one of the servo readers of the set: the gap between the first shield and the second shield of the one of the servo readers of the set is 0.8±0.2 µm; and the minimal width of the sensor, the first shield and the second shield of the one of the servo readers of the set, in a direction perpendicular to its gap, is 3±1 µm; a minimal width of a sensor, a first shield and a second shield of a servo reader of the set, is the width of the sensor of that servo reader; the tape drive head further comprises data read/write transducers whose dimensions differs from dimensions of the servo readers of the set; the tape drive head comprises three modules: a reader module and two writer modules, one on each side of the reader module, wherein the reader and the two writer modules comprise respective sets of servo readers, and wherein at least one of the respective sets corresponds to the set of one or more servo readers; and each of the respective sets of servo readers of the two writer modules corresponds to the set of one or more servo readers.

According to another aspect, the present invention is embodied as a tape drive comprising a tape drive head according to embodiments of the invention.

The invention may for instance be embodied as a tape drive head, comprising: a set of one or more servo readers designed for reading a servo pattern of a linear recording tape for positioning of the tape drive head, each of the servo readers of the set having: a sensor adapted for sensing a magnetic field component of a servo pattern; and a first shield and a second shield, one on each side of the sensor, the shields configured to shield spurious components of magnetic fields occurring upon reading the linear recording tape, wherein: a gap between the first shield and the second shield is between 0.4 µm and 1 µm, and a minimal width of the sensor, the first shield and the second shield is between 0.5 µm and 4 µm, the width defined in a direction perpendicular to the gap, in a sensing plane of the sensor, the first shield and the second shield, wherein the minimal width is less than or equal to five times the gap, and wherein for at least one servo reader of the set: the gap between the first shield and the second shield of the at least one servo reader of the set is 0.5±0.1 µm.

According to yet another aspect, a method of optimization of parameters of a tape drive head includes at least one servo reader designed for reading a servo pattern of a linear recording tape for positioning of the tape drive head, the at least one servo reader having: a sensor for sensing a magnetic field component of a servo pattern; and a first shield and a second shield on each side of the sensor, the shields configured to shield spurious components of magnetic fields occurring upon reading the linear recording tape, wherein the optimization method comprises jointly optimizing: a gap between the first shield and the second shield, and a minimal width of the sensor, the first shield and the second shield, the width defined in a direction perpendicular to the gap, in a sensing plane of the sensor, the first shield and the second shield.

Optimizing may include minimizing a position error signal standard deviation at a servo channel output according to values of the gap and width.

Devices and methods embodying the present invention will now be described, by way of non-limiting examples, and in reference to the accompanying drawings.

DETAILED DESCRIPTION

A key idea of the present disclosure is to jointly optimize the servo reader shield-to-shield distance (or gap) and servo reader width. So far, these two parameters were never jointly optimized, to the best knowledge of the Inventors. In fact, in the art, the servo reader width is traditionally not even regarded as a relevant parameter for optimization. In addition, even the shield-to-shield gap is in general not considered in optimization processes. Rather, this gap is typically scaled based on the design of the data readers, rather than independently designed to optimize the servo channel performance. Such approaches have resulted in a gradual reduction with time in servo reader shield-to-shield to a typical value of 200 to 300 nm.

At present, inventors have realized that, for given characteristics of the media, two design parameters of the servo reader (the shield-to-shield gap and the servo reader width) critically impact the shape, amplitude and signal to noise ratio of the servo read back waveform. These signal characteristics, in turn, have an impact on the resolution of the position estimates and hence on the overall performance of the track follow control system. Moreover, the performance of the track-follow controller determines the achievable track density and hence the cartridge capacity. Present inventors have therefore developed a method to determine optimal design parameters, i.e., to optimize the track-follow performance. Such optimal design parameters are described below.

A further consideration is that a given tape drive may have to operate with cartridges formatted with two or more different servo patterns. Some of the embodiments described below allow for optimizing performances for several servo formats that a given drive has to operate with.

Figure 5:
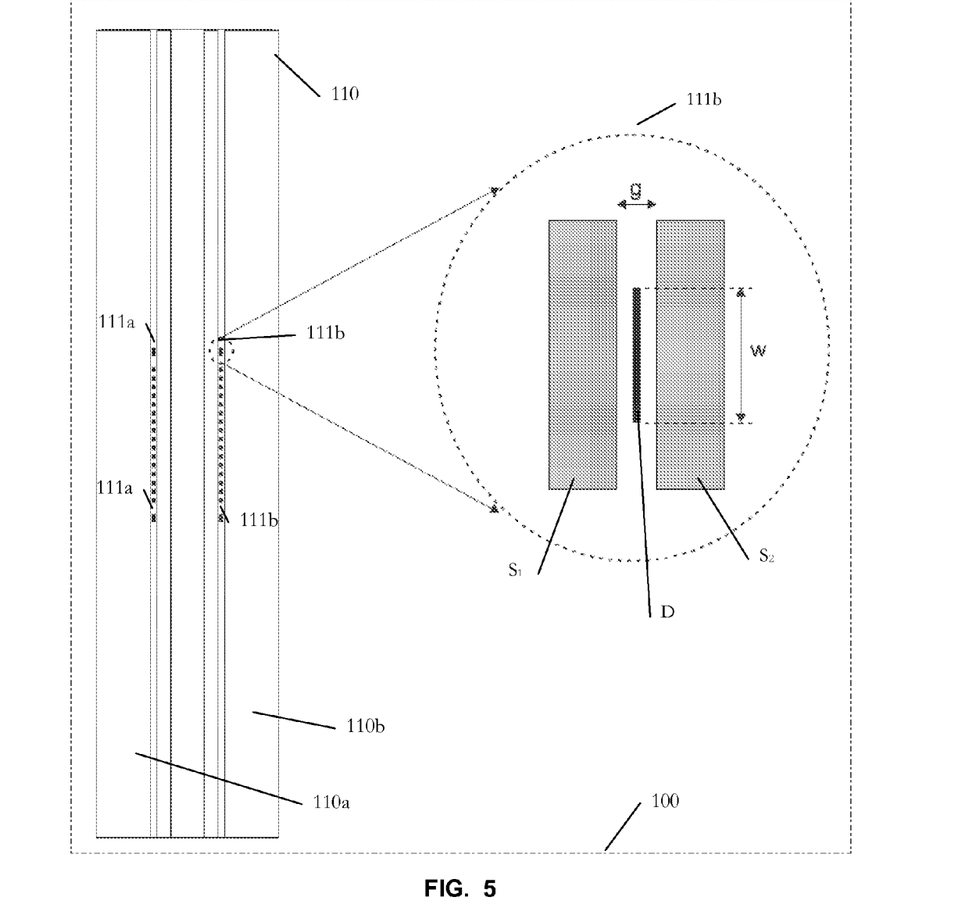
FIG. 5 represents a tape drive head, focusing on a given servo reader with a shield-to-shield gap and servo reader width optimized according to embodiments of the invention.

FIG. 5 represents a tape drive head, with emphasis put on one servo reader 111b thereof. The tape drive head 110 can be part of a tape drive 100 (only partly illustrated for conciseness). For the sake of illustration, a two head module is depicted, which shows two modules 110a and 110b. However, the tape drive head can more generally be composed of 1, 2, 3, . . . n modules. The head comprises at least one, and preferably two or more servo readers 111a, 111b, e.g., two or more servo readers 111a (respectively 111b) per module 110a (respectively 110b). As explained in the background section, such servo readers are designed for reading a servo pattern (see refs. 20 in FIGS. 1 and 21 in FIG. 2) of a linear tape (ref. 10, FIG. 1) for positioning of the head. As known, each servo reader notably comprises:

A sensor D, for sensing a magnetic field component of a servo pattern upon reading it, as known per se; and At least two shields $S_1$, $S_2$, the shields located on each side of the sensor D. The shields are configured to shield spurious components of magnetic fields occurring when reading the tape, as known per se.

Now, optimal design parameters are provided, according to an optimization process discussed below. Such parameters depend on external parameters, notably the characteristics of the medium and the servo patterns. The result of the various optimizations performed by the Inventors can nonetheless be fairly captured as follows:

The shield-to-shield gap g (i.e., between the shield $S_1$ and the shield $S_2$, as depicted in FIG. 5) is between 0.4 µm and 1 µm, and:

The servo reader width, i.e., the minimal width w amongst the sensor D, the first shield $S_1$ and the second shield $S_2$ (in a direction perpendicular to the gap, as depicted) is between 0.5 µm and 4 µm.

In addition, a footprint of the joint optimization is reflected in the following empirical rule: w≤5 g.

In practice, the minimal width w is typically the width of the sensor D. Also, in operation, the direction along which w is measured corresponds to a direction perpendicular to the gap g, in the tape bearing surface, which corresponds to a lower sensing plane of the servo reader. Thus, w is perpendicular to the direction of the tape motion during normal drive operation, see also FIG. 1. Other design parameters are otherwise in line with prior art's. In particular, the sensing (lower) surface of the servo reader, i.e., in contact with the servo band in operation, can be essentially flat, and the depth of the various layers (shields, sensor) will depend on sensor technology and other design considerations. In this respect, embodiments of the invention can be applied to the so-called AMR (anisotropic magneto-resistance), GRM (giant magneto-resistance) and TMR (tunneling magneto-resistance) technologies (Ref: "The Physics of Ultra-High Density Magnetic Recording, Plumer, van Ek, Weller (Eds.), Springer, Heidelberg 2001), which respectively involve additional design parameters known per se.

The above design, as well as other embodiments described below can notably be implemented in tape drives and tape drive heads such as depicted in FIGS. 1 and 3.

As it can be realized, one way of optimizing the design parameters is to minimize the position error signal (PES) standard deviation at the servo channel output as a function of the shield-to-shield distance and reader width. Of course, the optimization may be based on other parameters than the PES standard deviation. For instance, other quantities directly or indirectly related to the PES standard deviation could be involved, such as signal-to-noise ratio, velocity estimate standard deviation, and metric for the detection of LPOS symbols.

For example, a simple optimization algorithm consists of determining, for given values of w, corresponding values of g that minimizes the PES standard deviation in each case an in fine determine the pair $g_{min}$, $w_{min}$ corresponding to the overall minimum. In variants, one can first fix w (to $w_0$) and find the value of g ($g_0$) that minimizes the PES standard deviation. Next, relying on $g_0$ as input, an optimal value of w ($w_0$) can be obtained, which further minimizes the PES standard deviation, and so on. An example of optimization method is further discussed below.

Concerning now the model, the effect of head parameters on the read-back servo signal can for instance be tracked using a semi-analytic model and micromagnetic simulations to model the servo read-back waveform for various values of shield-to-shield distance and read spacing for various servo patterns.

The servo channel model is the following. The dibit response is obtained from read simulations, for a given format/medium, and three sources of additive noise are considered: White noise with power spectral density $N_0/2$;

Noise with power spectral density 1/f and energy associated with a dibit equal to P;

Media noise (position jitter noise) with energy associated with a dibit equal to $M_0$ Then the channel Signal-to-noise ratio (SNR) can be defined at the input of the servo channel, i.e., by $SNR=E_d/(N_0/2+P+M_0)$, where $E_d$ is the dibit energy.

For completeness, this model further assumes:

A constant electronic noise level (e.g., 23-25 dB) and a constant signal-to-transition noise ratio (e.g., 33 dB), in agreement with experimental observations;

A white noise and 1/f noise with equal power; and

Zero lateral tape motion.

Next, in the present simulations, three servo patterns have been considered, written on three different media types. Namely:

For the media

The so-called metal particle (MP) media, i.e., longitudinally oriented media such as that used in LTO1-LTO5;

The NO—BaFe media, where NO—BaFe stands for non-oriented BaFe media such as described in D. Berman et al., "6.7 Gb/in$^2$ recording areal density on barium ferrite tape," IEEE Transactions on Magnetics, 43(8) (August 2007);

The P—BaFe media, denoting perpendicularly oriented BaFe such as described in G. Cherubini et al. "29.5 Gb/in$^2$ Recording Areal Density on Barium Ferrite Tape", IEEE Transactions on Magnetics 47(1) (January 2011);

For the servo patterns:

A [4 4 5 5] servo pattern with a 6 degree stripe angle and a dibit peak to peak distance of 2.1 µm, such as that used in LTO generations 2-5 and described in Standard ECMA-319, "Data interchange on 12.7 mm 384-track magnetic tape cartridges—Ultrium-1 format," June 2001., referred to here as Pattern_1;

A [4 4 5 5] servo pattern with a 12 degree stripe angle and a dibit peak to peak distance of ~1.25 µm, referred to here as Pattern_2; and A [4 4 5 5] servo pattern with an 18 degree stripe angle and a dibit peak to peak distance of ~1.0 µm, as described G. Cherubini et al. "29.5 Gb/in$^2$ Recording Areal Density on Barium Ferrite Tape", IEEE Transactions on Magnetics 47(1) (January 2011), referred to here as Pattern_3.

The corresponding read-back waveforms are used as input to a simulation of the servo channel and track-follow system to study the impact on overall system performance.

Figure 6:
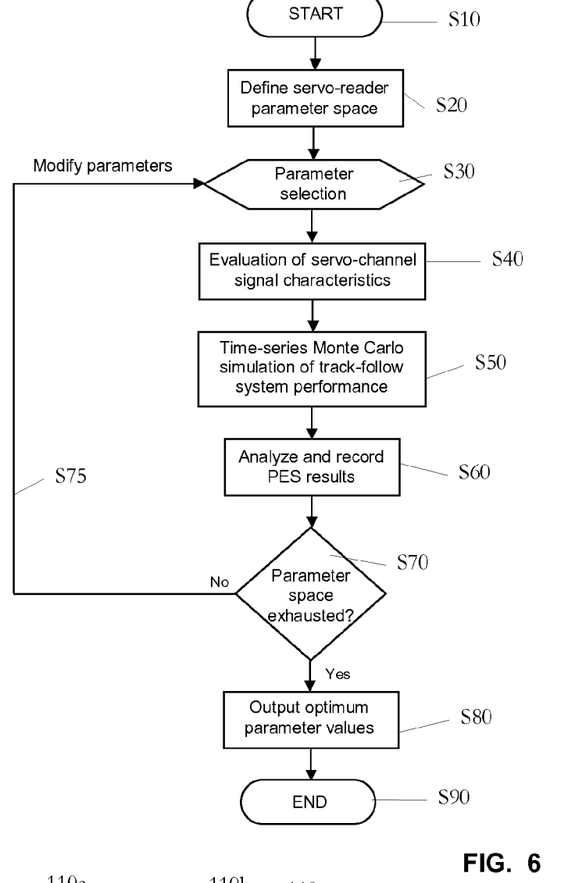
FIG. 6 depicts steps of a method of optimization of parameters of a tape drive head, according to embodiments.
Figure 7:
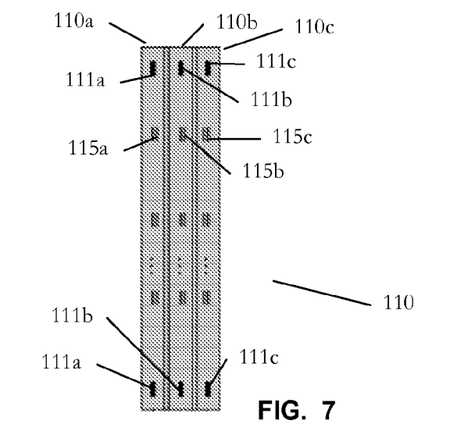
FIG. 7 represents a three module tape drive head, according to embodiments of the invention.

A flow chart formally describing steps of an example of optimization method is shown in FIG. 6:

Step S10: The process starts;

Step S20: The parameter space (e.g., including g and w) is defined;

Step S30: A selection of parameters is performed. These parameters are typically initially guessed, e.g., based on experience. The parameter space can next be systematically explored (e.g., each point on a 1D or 2D grid for g and/or w is explored). In variants, any suitable minimization algorithm may be invoked, e.g., based on a local slope, to achieve a local minimum;

Step S40: Servo-channel signal characteristics are evaluated, to serve as input for the next steps;

Step S50: A time-series Monte Carlo simulation of track-follow system performance is carried out;

Step S60: PES results are analyzed and stored;

Step S70: As long as there remains room to further explore the parameter space, the process loops back to step S30; and Step S75: One or more of these parameters are modified, e.g., to follow a path on a 2D grid of values for g, w, as evoked earlier. In variants, depending on the minimization algorithm chosen, a pair of values $g_n$, $w_n$ can be extrapolated from interpolations of $g_{n-1}$, $w_{n-1}$ and $g_{n-2}$, $w_{n-2}$, etc., as suggested from usual minimization techniques. In yet other variants, one value is fixed (e.g., $w_0$) and the parameter space of g is further explored in order to locate that value of g which minimizes the PES standard deviation, as evoked earlier.

Step S70: When the parameter space is exhausted or a local minimum is found, parameters corresponding to that minimum are located; and Step S80: These parameters are returned.

Step S90: The process stops.

Obviously, many variants to the above scheme can be devised, as generally known from optimization techniques: essentially any optimization algorithm for determining optimal values for parameters g, w, e.g., based on a minimization of the PES standard deviation at a servo channel output as a function of input values of g, w.

As a basic example, simulations performed with a servo reader width initially set to 3 µm, the minimum of the PES standard deviation is obtained for shield-to-shield gaps of:

0.5±0.1 µm, which surprisingly turned out to be essentially the same value for two of the tested media, namely the NO—BaFe and P—BaFe media and together with both the 12 and 18 degree servo patterns; and 0.8±0.2 µm for MP media and Pattern_1.

Two main advantages are the increased head reliability and improved PES performance. Note in passing that the usual shield-to-shield gap values (180-350 nm) used in actual manufactured servo readers therefore appear to be sub-optimal to ensure reliable head operation.

Accordingly, a first preferred value for the shield-to-shield gap is 0.5±0.1 µm. A second preferred value is 0.8±0.2 µm. Altogether, these two preferred values spans a range of values between 0.4 µm and 1 µm, as indicated before.

Another, perhaps more precise way of formulating preferred values for the gap is g=0.5 (±0.1)×s/1.25 µm, where s denotes the nominal distance (in µm) between positive and negative peaks of a dibit in a servo burst. In particular, optimal values of g are approximately given by g=0.5×s/1.25 µm for Pattern 1/MP media (longitudinal), and g=0.6×s/1.25 for Pattern_2/ NO—BaFe media (non oriented). Note that the nominal distance s between positive and negative dibit peaks is typically 2.1 µm for Pattern_1, 1.26 µm for Pattern_2 and ≤1.26 µm for Pattern_3.

Similarly, a way of formulating preferred values for the width is w=15/α+s/1.25±0.5 µm, where a is the stripe angle (in degrees, the constant 15 having units of microns×degrees), which formula works for each format tested.

Optimization methods such as described above can for instance be applied for independently determining optimal servo reader parameters for reading e.g., Pattern_2 on NO—BaFe media, or Pattern_1 on MP media, etc., or to find optimal values for two or more servo patterns. Accordingly, one may contemplate configurations wherein at least two servo readers, each having independently optimized design parameters, are arranged on a head module instead of one, for optimally reading e.g., Pattern_2 on NO—BaFe media and Pattern_1 on MP media.

As another example, applying the above method made it possible to conclude that an optimal servo reader geometry for Pattern_3/P—BaFe media consists of servo readers that are 2.0 µm wide (±0.5 µm) with a shield-to-shield gap of 0.5 µm (±0.1 µm). Yet, reduced width (1.0-1.5 µm) could be preferable due to expected gains in media signal to noise ratio.

Figure 4:
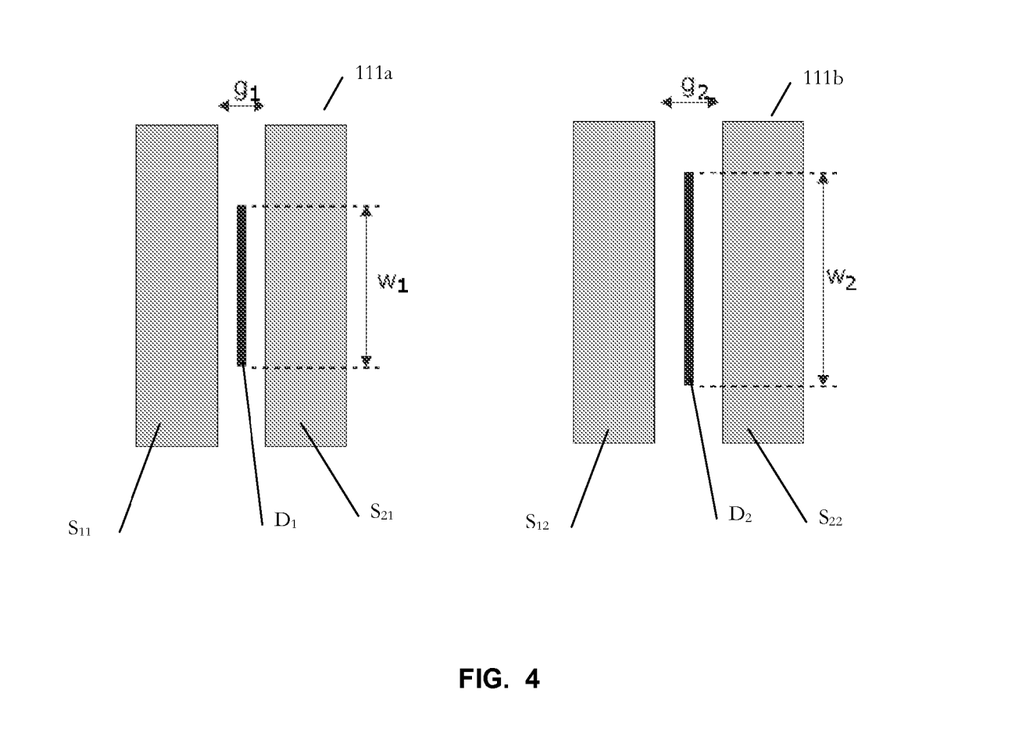
FIG. 4 schematically illustrates two servo readers of a tape drive head, according to a specific embodiment of the present invention, where the two servo readers have different shield-to-shield gaps and sensor widths.

The optimal geometry returned by the simulations depends on the format/medium given as input. In the following, examples of possible configurations are given in a synthetic format, as suggested by various simulations carried out by the Inventors:

First, as the, a generally optimal value for the shield-to-shield gap and for most of the formats/media turns out to be 0.5±0.1 µm. For other formats/media tested, this value is 0.8±0.2 µm;

In the first case (g=0.5±0.1 µm), the width w of the sensor D (i.e., the minimal width amongst the sensor D, the first shield $S_1$ and the second shield $S_2$, as depicted in FIG. 4 or 5) is preferably 2±1 µm (more preferably ±0.5 µm);

In the second case (g=0.8±0.2 µm), the width w of the sensor is preferably 3±1 µm (and more preferably ±0.5 µm);

Interestingly, the examples tested in the context of this invention obey an empirical rule for the jointly optimized parameters, which is w/5≤g. Also, it is observed that the following, somewhat tighter empirical rule is verified in most cases: w/4≤g≤w/2. Now, it is advantageous to keep g as high as possible to avoid short circuits arising from conducting particles that stick on the servo reader components, e.g., a particle or a deformed component bridges a shield with the sensor.

Now, as noted earlier too, one may contemplate configurations wherein two servo readers or more with independently optimized parameters are arranged on a same head (or head module), as schematically depicted in FIG. 4. Specifically, and for the sake of compatibility, a two or three module head may be designed, with at least one servo reader on at least one of the modules being 1.0-3.0 µm wide with a shield-to-shield gap of 0.5 (±0.1 µm). In particular, one of the servo readers 111*b* of the head may have a larger gap than the other servo reader 111*a*. For example, the gap $g_1$ between shield $S_{11}$ and shield $S_{21}$ for the servo reader 111*a* is 0.5±0.1 µm, while the gap $g_2$ for servo reader 111*b* (between $S_{12}$ and $S_{22}$) is 0.8±0.2 µm. Similarly, the minimal width $w_1$ of sensor $D_1$ may be 2±1 µm, while the width $w_2$ of sensor $D_2$ is 3±1 µm.

Other variations can be contemplated, e.g., wherein a head module has two or more servo readers, each optimized for a given type of servo pattern, etc.

Furthermore, the present invention can be, in embodiments, directed to a tape drive head or a tape drive head module such as described above, a tape drive comprising that head or module or a system comprising that tape drive. Integration of a head or a head module in a tape drive is known per se.

Finally, a specific embodiment concerns a three-module head 110 such as schematically represented in FIG. 8. The outermost modules 110*a*, 110*c* are writer modules, while the inner module 110*b* is a reader module. Such a configuration is especially suitable for use with bi-directional tape motion, because readers need to read data just written by a writer module for verification purpose, for each of the forward/backward direction of the tape motion. Here the servo readers 111*a-c* involved in each of the modules may be at least partly optimized according to the present scheme. However, since the writer and reader modules may need to be independently designed, optimized, manufactured, etc., the outermost writer module 110*a*, 110*c* may comprise servo readers 111*a*, 111*c* optimized according to the present scheme, while the servo readers 111*b* of the reader module differ, and conversely. More generally, the reader and the writer modules comprise respective sets of servo readers, and at least one (or more) of the respective sets is a set of servo readers optimized such as described above.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For example, while the embodiments illustrated above merely concern two head modules, three head modules may be contemplated.

The invention claimed is:

1. A tape drive head, comprising:
a set of one or more servo readers designed for reading a servo pattern of a linear recording tape for positioning of the tape drive head, each of the servo readers of the set having:
a sensor adapted for sensing a magnetic field component of a servo pattern;
a first shield and a second shield, one on each side of the sensor, the shields configured to shield spurious components of magnetic fields occurring upon reading the linear recording tape, wherein:
a gap between the first shield and the second shield is between 0.4 µm and 1 µm, and
a minimal width of the sensor, the first shield and the second shield is between 0.5 µm and 4 µm, the width defined in a direction perpendicular to the gap, in a sensing plane of the sensor, the first shield and the second shield.

2. The tape drive head of claim 1, wherein the minimal width is less than or equal to five times the gap.

3. The tape drive head of claim 1, wherein the minimal width is less than or equal to four times the gap.

4. The tape drive head of claim 1, wherein, for at least one servo reader of the set:
the gap between the first shield and the second shield of the at least one servo reader of the set is 0.5±0.1 µm.

5. The tape drive head of claim 1, wherein, for at least one servo reader of the set:
the gap between the first shield and the second shield of the at least one servo reader of the set is 0.5±0.1 µm; and
the minimal width of the sensor, the first shield and the second shield of the at least one servo reader of the set, in a direction perpendicular to its gap, is 2±1 µm.

6. The tape drive head of claim 1, wherein, for at least one servo reader of the set:
the gap between the first shield and the second shield of the at least one servo reader of the set is 0.5±0.1 µm; and
the minimal width of the sensor, the first shield and the second shield of the at least one servo reader of the set, in a direction perpendicular to its gap, is 2±0.5 µm.

7. The tape drive head of claim 1, wherein, for at least one servo reader of the set:
the gap between the first shield and the second shield of the at least one servo reader of the set is 0.5±0.1 µm; and
the minimal width of the sensor, the first shield and the second shield of the at least one servo reader of the set, in a direction perpendicular to its gap, is 1±0.5 µm.

8. The tape drive head of claim 1, wherein, for at least one servo reader of the set:
the gap between the first shield and the second shield of the at least one servo reader of the set is 0.8±0.2 µm.

9. The tape drive head of claim 1, wherein, for at least one servo reader of the set:
the gap between the first shield and the second shield of the at least one servo reader of the set is 0.8±0.2 µm; and
the minimal width of the sensor, the first shield and the second shield of the at least one servo reader of the set, in a direction perpendicular to its gap, is 3±1 µm.

10. The tape drive head of claim 1, wherein the set comprises at least two servo readers, wherein one of the at least two servo readers has a larger gap than another one of the at least two servo readers.

11. The tape drive head of claim 10, wherein:
the gap between the first shield and the second shield of the another one of the at least two servo readers is 0.5±0.1 µm; and
the gap between the first shield and the second shield of the one of the at least two servo readers is 0.8±0.2 µm.

12. The tape drive head of claim 11, wherein:
for the another one of the servo readers of the set:
the gap between the first shield and the second shield of the another one of the servo readers of the set is 0.5±0.1 µm; and
the minimal width of the sensor, the first shield and the second shield of the another one of the servo readers of the set, in a direction perpendicular to its gap, is 2±1 µm, and for the one of the servo readers of the set:
the gap between the first shield and the second shield of the one of the servo readers of the set is 0.8±0.2 µm; and
the minimal width of the sensor, the first shield and the second shield of the one of the servo readers of the set, in a direction perpendicular to its gap, is 3±1 µm.

13. The tape drive head of claim 1, wherein a minimal width of a sensor, a first shield and a second shield of a servo reader of the set, is the width of the sensor of that servo reader.

14. The tape drive head of claim 1, further comprising data read/write transducers whose dimensions differs from dimensions of the servo readers of the set.

15. The tape drive head of claim 1, comprising three modules:
a reader module and two writer modules, one on each side of the reader module, wherein the reader and the two writer modules comprise respective sets of servo readers, and wherein at least one of the respective sets corresponds to the set of one or more servo readers.

16. The tape drive head of claim 15, wherein each of the respective sets of servo readers of the two writer modules corresponds to the set of one or more servo readers.

17. A tape drive comprising the tape drive head of claim 1.

18. A tape drive head, comprising:
a set of one or more servo readers designed for reading a servo pattern of a linear recording tape for positioning of the tape drive head, each of the servo readers of the set having:

a sensor adapted for sensing a magnetic field component of a servo pattern;

a first shield and a second shield, one on each side of the sensor, the shields configured to shield spurious components of magnetic fields occurring upon reading the linear recording tape, wherein:

a gap between the first shield and the second shield is between 0.4 µm and 1 µm, and a minimal width of the sensor, the first shield and the second shield is between 0.5 µm and 4 µm, the width defined in a direction perpendicular to the gap, in a sensing plane of the sensor, the first shield and the second shield, and wherein, the minimal width is less than or equal to five times the gap, and wherein, for at least one servo reader of the set:

the gap between the first shield and the second shield of the at least one servo reader of the set is 0.5±0.1 µm.

* * * * *